US008602388B2

(12) United States Patent
Garcia

(10) Patent No.: US 8,602,388 B2
(45) Date of Patent: Dec. 10, 2013

(54) MANUAL FORCE REDUCTION DEVICE

(75) Inventor: Gustavo Esquivel Garcia, Waverly, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 964 days.

(21) Appl. No.: 12/608,050

(22) Filed: Oct. 29, 2009

(65) Prior Publication Data

US 2011/0101288 A1     May 5, 2011

(51) Int. Cl.
*B66F 13/00* (2006.01)
*B66F 1/00* (2006.01)
*B66F 1/04* (2006.01)
*B66F 3/00* (2006.01)
*B23Q 3/00* (2006.01)
*B25B 1/06* (2006.01)

(52) U.S. Cl.
USPC ............... 254/1; 254/105; 254/120; 254/123; 254/129; 254/112; 254/232; 254/234; 269/238; 269/239; 269/254 CS

(58) Field of Classification Search
USPC ...................... 254/1, 120, 123, 129, 112, 105, 254/232–234; 269/238, 239, 254 CS
See application file for complete search history.

(56) References Cited

U.S. PATENT DOCUMENTS

| | | | |
|---|---|---|---|
| 3,536,207 A | 10/1970 | Weir | |
| 4,108,061 A | 8/1978 | Bowser | |
| 4,260,309 A | 4/1981 | Lynn | |
| 4,804,433 A * | 2/1989 | Smith | 156/359 |
| 4,874,156 A * | 10/1989 | Goldzweig | 269/158 |
| 5,137,263 A * | 8/1992 | Savoie et al. | 269/266 |
| 5,377,456 A * | 1/1995 | Dixon | 451/364 |
| 5,460,479 A | 10/1995 | Neumann et al. | |
| 5,913,655 A | 6/1999 | Maday | |
| 5,944,479 A | 8/1999 | Kanaya et al. | |
| 6,953,188 B2 * | 10/2005 | Siegel | 269/266 |
| 7,063,206 B2 | 6/2006 | Haan et al. | |

* cited by examiner

*Primary Examiner* — Monica Carter
*Assistant Examiner* — Nirvana Deonauth
(74) *Attorney, Agent, or Firm* — Gifford, Krass, Sprinkle, Anderson & Citkowski, P.C.

(57) ABSTRACT

The present invention discloses a manual force reduction device for reducing a force required to initiate movement of a load by a separate mechanism. The device can have an energy storage mechanism that has a compressed position and a released position, and the energy storage mechanism can be operable to store a predetermined amount of energy when it is in the compressed position. A latch can be included and be used to hold the energy storage mechanism in the compressed position. At a desired time, a latch release can release the energy storage mechanism from the compressed position such that the predetermined amount of energy is released and transferred to the load.

20 Claims, 4 Drawing Sheets

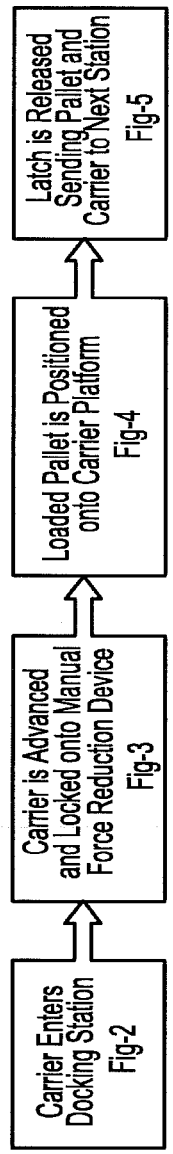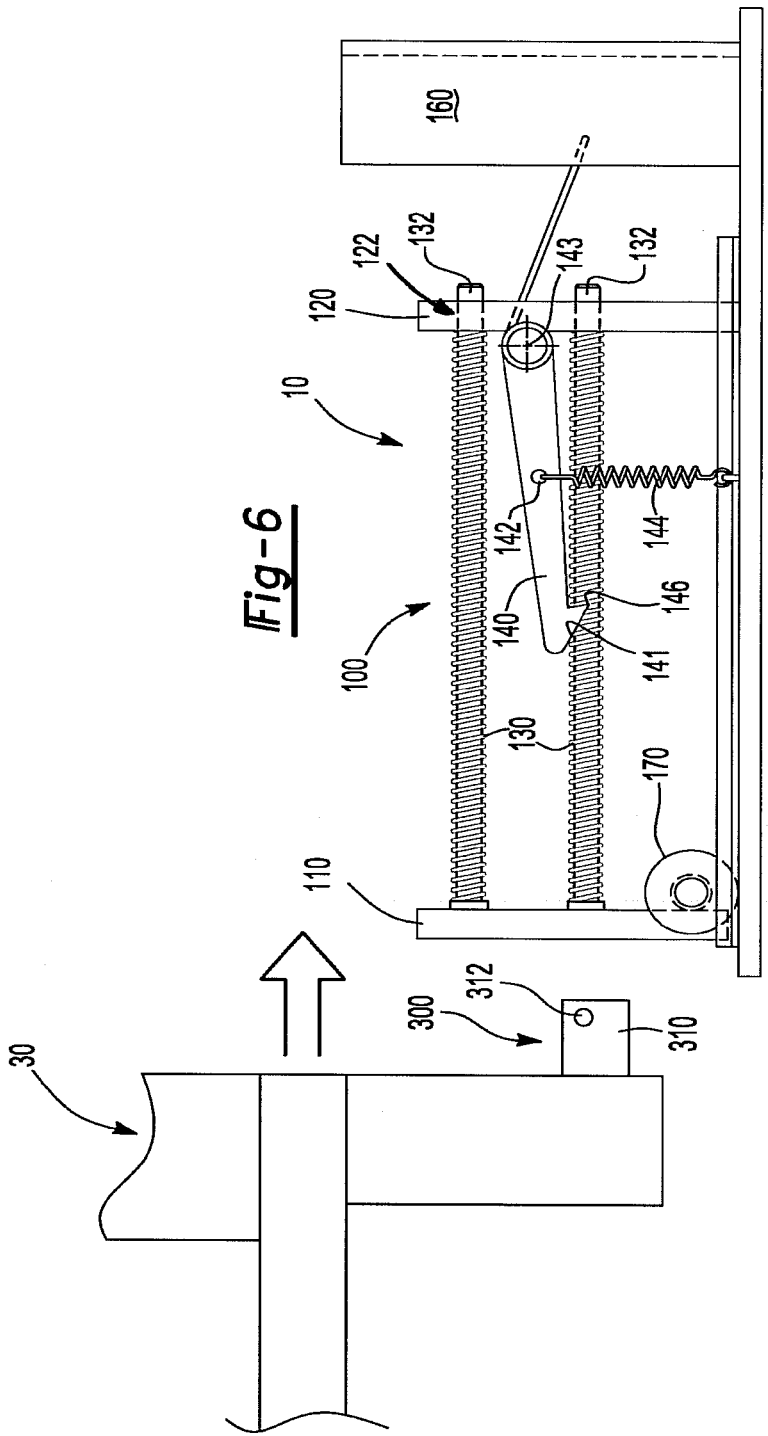

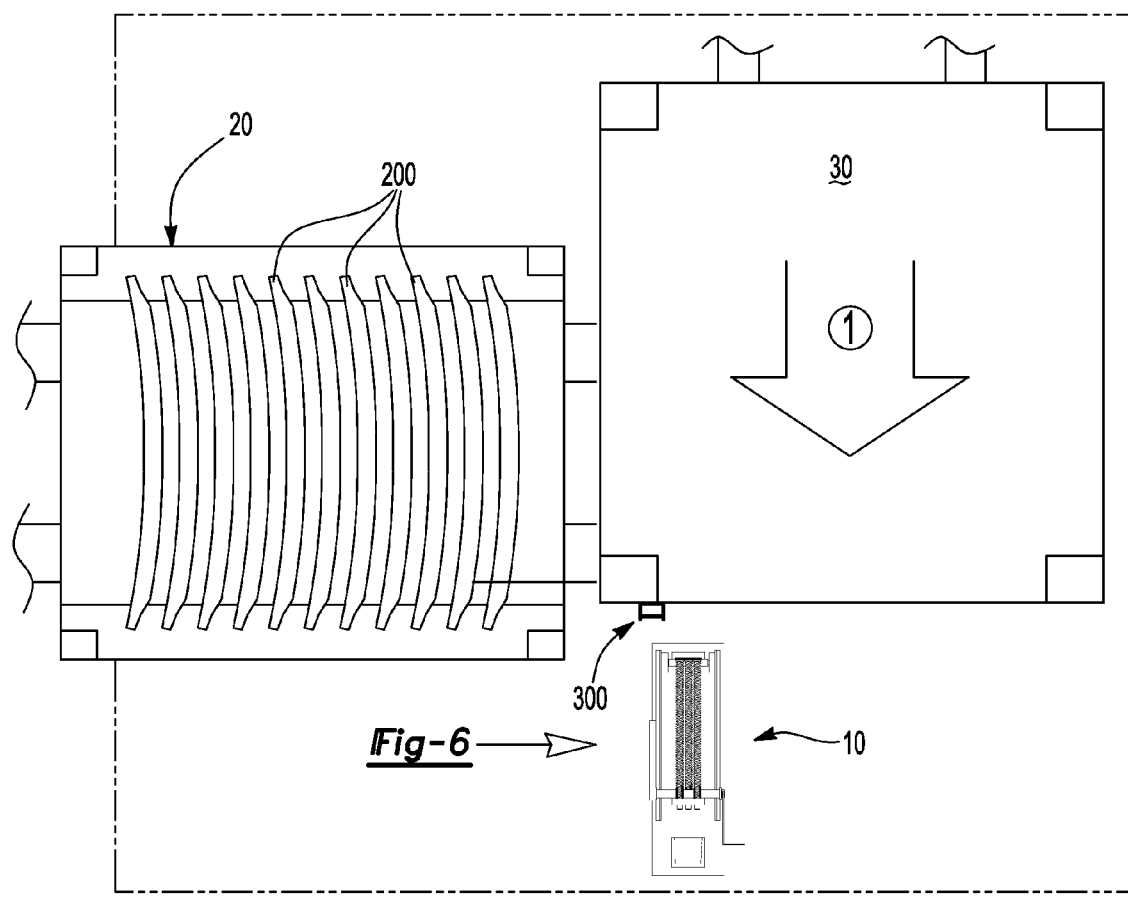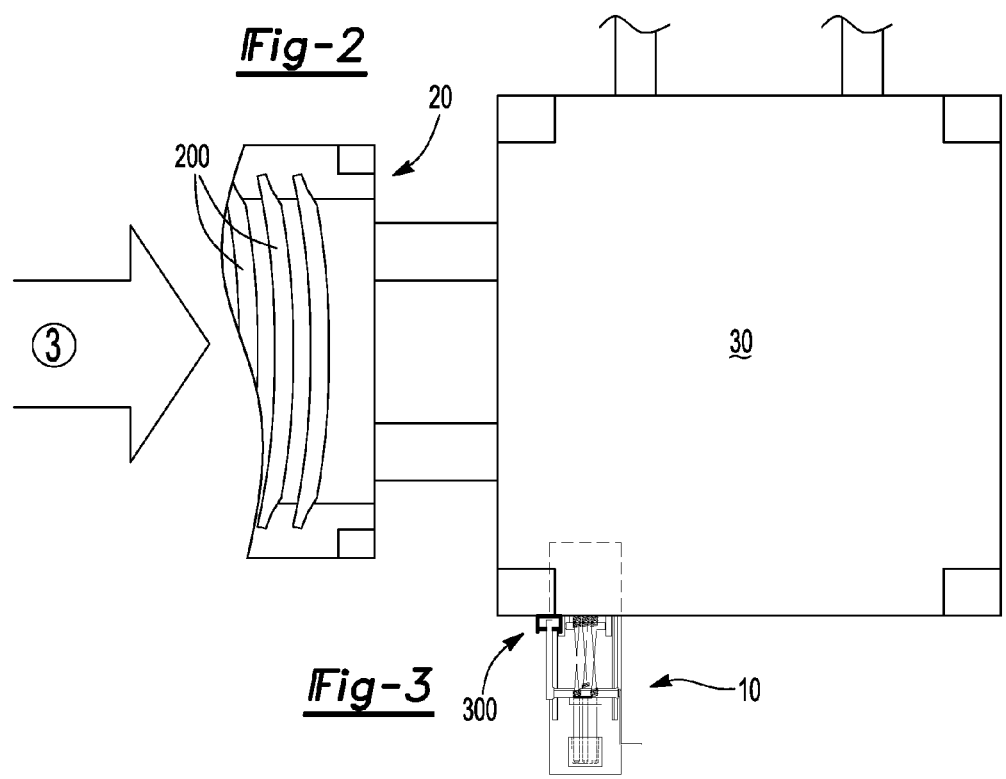

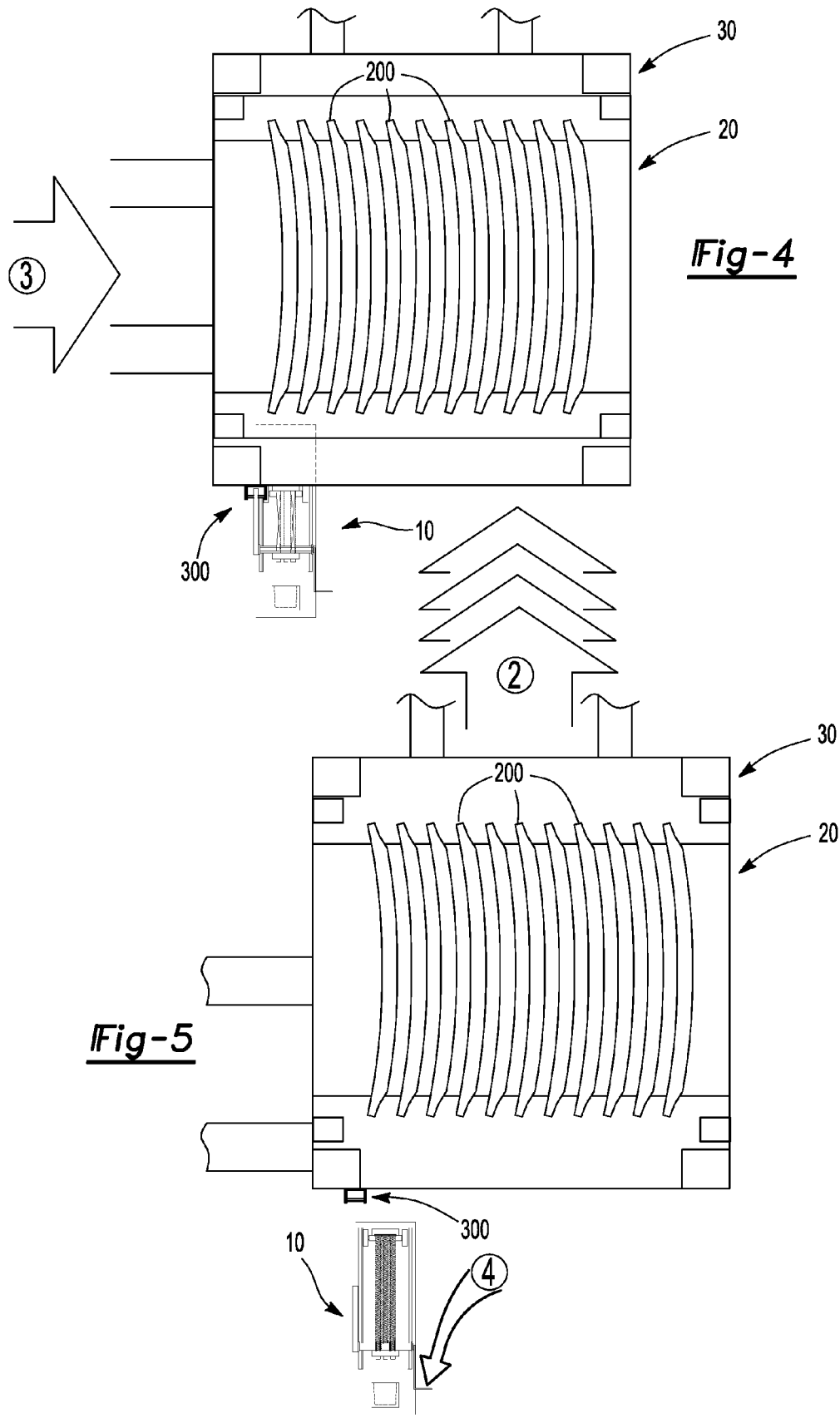

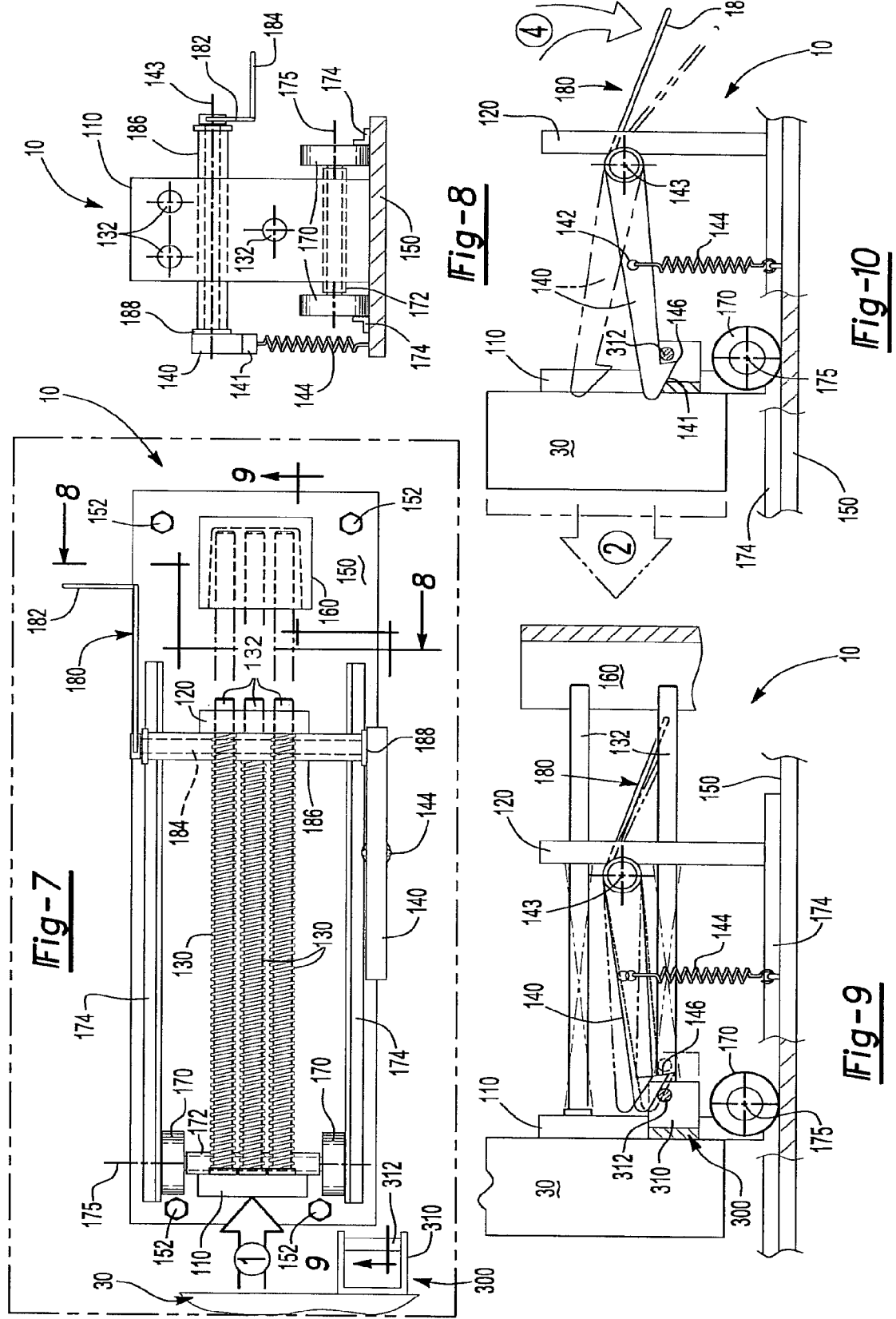

MANUAL FORCE REDUCTION DEVICE

FIELD OF THE INVENTION

The present invention is related to a manual force reduction device for reducing a force required to initiate movement of a load.

BACKGROUND OF THE INVENTION

The use of pallets, palletizers and the like for moving equipment, components, factory parts, etc. is known. For example, such components, factory parts, etc. can be stacked onto a pallet, the pallet placed onto a palletizer and the palletizer moved manually, by mechanical force, by hydraulic force, etc. In some instances, it can be desirable for the palletizer to be moved by one or more individuals from one location to another location within a factory. However, the movement of such a palletizer can require heavy exertion by an individual in order to initiate movement of the palletizer. Therefore, a low cost, simple to use, and effective apparatus that can assist an individual in initiating movement of such a load would be desirable.

SUMMARY OF THE INVENTION

The present invention discloses a manual force reduction device for reducing a force required to initiate movement of a load by a separate mechanism. The device can have an energy storage mechanism that has a compressed position and a released position, and the energy storage mechanism can be operable to store a predetermined amount of energy when it is in the compressed position. A latch can be included and be used to hold the energy storage mechanism in the compressed position. At a desired time, a latch release can release the energy storage mechanism from the compressed position such that the predetermined amount of energy is released and transferred to the load. In this manner, the force required to initiate movement of the load by a separate mechanism such as an individual can be reduced.

The energy storage mechanism can have a contact plate, a backing plate, and a coil spring. The coil spring can be located between the contact plate and the backing plate and be compressed therebetween when the contact plate is displaced in a first direction. In addition, when the load is in contact with the contact plate and displaced in the first direction a predetermined distance, the latch can engage and hold the load in a fixed position adjacent to the manual force reduction device. Stated differently, the load can be attached to the energy storage mechanism when the latch engages the load. It is appreciated that the coil spring can store the predetermined amount of energy when it is compressed. The latch release can disengage the latch from the load, and the coil spring can release the predetermined amount of stored energy when the contact plate is displaced in a second direction.

In some instances, the manual force reduction device can reduce a force required by an individual to initiate movement of a palletizer that has a plurality of components stacked thereon. It is appreciated that the contact plate can have a compressed position and a released position. In the compressed position, the coil spring can be compressed a first amount and in the released position the coil spring may or may not be compressed a second amount, the second amount being less than the first amount. In addition, the contact plate is operable to be displaced in the first direction when the palletizer moves in the first direction and comes into contact with the contact plate. Displacement of the contact plate in the first direction can compress the coil spring, thereby affording for the coil spring to store the predetermined amount of energy. The contact plate can be a generally vertical contact plate which affords for the palletizer to come into contact therewith when it is placed adjacent to the plate and moved in the first direction. Furthermore, the generally vertical contact plate can push on the pallet when the coil spring decompresses and the generally vertical contact plate moves from the compressed position towards the released position.

A backing plate having a rod aperture can be included with a rod that is attached to the contact plate extending through the rod aperture and sliding through the backing plate. The coil spring, located between the contact plate and the backing plate, can be at least partially around or on the rod. In some instances, the backing plate can have a fixed position and the coil spring can be compressed up against the backing plate when the contact plate is displaced in the first direction and the rod slides through the rod aperture of the backing plate.

The latch can have a latch tab that is operable to engage the palletizer when the palletizer is displaced a predetermined distance in the first direction against the contact plate. In addition, the latch with the latch tab can pivot about a latch axis and the latch release can be attached to the latch using a pivot rod. In some instances, the latch release is a lever and may or may not be a foot-activated lever/latch release. The latch can pivot about the latch axis in a generally upward direction when the palletizer is displaced in the first direction and comes into contact with the catch tab of the latch and can pivot about the latch axis in a generally downward direction when the latch tab engages the palletizer. And finally, the pivoting of the latch with the catch tab in a generally upward direction about the latch axis can result in the catch tab disengaging the palletizer.

BRIEF DESCRIPTION OF THE DRAWINGS

FIG. 1 is a block diagram describing the motion and positions illustrated in FIGS. 2-5;

FIG. 2 is a top view of a palletizer moving in a first direction towards a manual force reduction device according to an embodiment of the present invention;

FIG. 3 is a top view of the palletizer attached to the manual force reduction device shown in FIG. 2 with a pallet having a plurality of components moving towards the palletizer;

FIG. 4 is a top view of the pallet with the plurality of components shown in FIG. 3 having been placed onto the palletizer that is attached to the manual force reduction device;

FIG. 5 is a top view of the palletizer with the pallet and plurality of components having been pushed by the manual force reduction device in a second direction 2;

FIG. 6 is a side view of the manual force reduction device shown in FIG. 2;

FIG. 7 is a top view of the manual force reduction device shown in FIG. 6;

FIG. 8 is a cross-sectional view of the section 8-8 shown in FIG. 7;

FIG. 9 is a side view of the manual force reduction device shown in FIG. 6 attaching to the palletizer; and FIG. 10 is a side view of the manual force reduction device shown in FIG. 9 releasing the palletizer.

DETAILED DESCRIPTION OF THE INVENTION

The present invention discloses a manual force reduction device for reducing a force required to initiate movement of a load by a separate mechanism. As such, the manual force reduction device has utility for moving loads in a manufacturing facility.

The manual force reduction device can include an energy storage mechanism that has a compressed position and a released position, and the energy storage mechanism is operable to store a predetermined amount of energy when in the compressed position. A load can be placed adjacent to and in contact with the energy storage mechanism and a latch can be included that is operable to hold the energy storage mechanism in the compressed position. A latch release can release the energy storage mechanism from the compressed position and thereby afford for the energy storage mechanism to transfer the predetermined amount of energy to the load. In this manner, the force required to initiate movement of the load by a separate mechanism can be reduced.

In some instances, the energy storage mechanism can have a contact plate, a backing plate, and a coil spring. The coil spring can be located between the contact plate and the backing plate. The coil spring can also be compressed between the two plates when the contact plate is displaced in a first direction. It is appreciated that compressing of the coil spring can result in the spring having at least part of the predetermined amount of stored energy.

The latch can engage the load when the load is placed in contact with the contact plate and displaced in the first direction a predetermined distance. The latch release can disengage the latch from the load and the coil spring can release at least part of its predetermined amount of stored energy, thereby transferring energy to the load. It is appreciated that the coil spring can decompress and afford for the contact plate to be displaced in a second direction, and if the contact plate is in contact with the load, result in a reduction of force required to initiate movement of the load by the separate mechanism.

Turning now to FIGS. 1-5, FIG. 1 illustrates a block diagram that provides a brief description of motion and positions represented in FIGS. 2-5. In particular, FIG. 2 illustrates a carrier or palletizer 30 entering into a docking station where a manual force reduction device 10 is located. It is appreciated that the docking station can be a location where a transfer of a plurality of components 200 from a pallet 20 to the palletizer 30 can occur.

As stated in FIG. 1, FIG. 3 illustrates that the carrier or palletizer 30 is advanced and locked onto the manual force reduction device 10. In addition, the pallet 20 is moved (see arrow 3) such that the plurality of components 200 are placed onto the palletizer 30 as illustrated in FIG. 4. And finally, FIG. 5 illustrates the release of the manual force reduction device 10 by movement of a latch release 180 (see arrow 4), thereby resulting in the reduction of a force required to initiate movement of the palletizer 30 in a second direction 2 by a separate mechanism.

Turning now to FIGS. 6-10, the manual force reduction device 10 is shown in greater detail. The device 10 can have an energy storage mechanism 100 that has a compressed position as shown in FIGS. 3 and 4, and a released position as shown in FIG. 5. It is appreciated that FIG. 6 illustrates the energy storage mechanism 100 in the released position.

The energy storage mechanism 100 can have a contact plate 110 and a backing plate 120. In between the contact plate 110 and the backing plate 120 can be a coil spring 130. In addition, an optional rod 132 can be attached to the contact plate 110 with the backing plate 120 having a rod aperture 122 that affords for the rod 132 to slide through the backing plate 120. In some instances, there can be more than one rod 132 attached to the contact plate 110 and the backing plate 120 can have more than one rod aperture 122 through which the rods can slide through. In addition, the coil spring 130 may or may not be located at least partially on or around the rod 132 as illustrated in FIG. 6.

The device 10 can also have a latch 140 with a latch release 180. In some instances, the latch 140 can have an aperture 142 that affords for a spring 144 to be attached thereto, the spring 144 also being attached to a base 150. In this manner, the spring 144 can afford for the latch 140 to be held in a predisposed position. The device 10 can also have a track mechanism 170 that affords for the contact plate 110 to be displaced in the first direction 1 in a controlled manner. The track mechanism 170 can be in the form of one or more wheels that rotate about a wheel axis 175, however this is not required. In addition, one or more track members 174 can be attached to the base 150 to ensure that the track mechanism 170 moves in the first direction 1 within given constraints.

The latch 140 can be attached to the latch release 180 at attachment location 188 using a pivot rod. The pivot rod can be located at least partially within a tube 186 and thereby afford for rotation about a latch axis 143. In addition, the latch release 180 can have a first member 182 and a second member 184, the second member 184 extending in a generally normal direction from the first member 182. Such an arrangement provides for a convenient hand or foot lever that can be pushed in a generally downward direction in order to release the load or palletizer 30 from the manual force reduction device 10.

The carrier or palletizer 30 can have a corresponding catch mechanism 300, for example a pair of spaced apart tabs 310 with a pin or rod 312 extending therebetween. As the palletizer 30 moves in the first direction 1, the palletizer 30 can come into contact with the contact plate 110 and can move the contact plate also in the first direction 1. As the contact plate moves in the first direction 1, the coil spring 130 compresses; and if continued, the pin 312 can come into contact with an inclined surface 141 of the latch 140. The inclined surface 141 affords for pivoting of the latch 140 in a generally upward direction as shown in FIG. 9. After the palletizer 30 and contact plate 110 have been moved in the first direction a predetermined direction, a catch tab 146 can engage or drop behind the pin 312 with pivotal movement of the latch 140 in a generally downward direction. In this manner, the palletizer 30 can be held up against the contact plate 110 and the contact plate 110 held in the compressed position. It is appreciated that with the contact plate 110 held in the compressed position, the coil spring 130 can be compressed and have a predetermined amount of stored energy.

When it is desired for the palletizer 30 to be moved in the second direction 2 as illustrated in FIG. 5, the latch release 180 can be displaced such that the latch 140 pivots in a generally upward direction as shown in FIG. 10. The pivoting of the latch 140 in the generally upward direction results in the catch tab 146 no longer engaging the pin 312 and the coil spring 130 no longer being held in the compressed position. As such, the coil spring 130 can attempt to decompress. Assuming that the palletizer 30 is not too heavy, too difficult to move and/or an individual can assist in the movement of the palletizer 30 in the second direction, the coil spring 130 can decompress and transfer at least part of its stored energy to the palletizer 30. In this manner, a separate mechanism such as an individual that is required to move the palletizer with the plurality of components 200 stacked thereon in the second direction 2 can be aided in how much force or exertion must be applied in order to initiate movement thereof.

It is appreciated that the use of the coil spring 130 results in a mechanical storage of energy and thus does not require the use of any electronics, hydraulics, and the like to reduce the force required to initiate movement of the palletizer 30 by the separate mechanism. As such, a simple, dependable, effective, and cost-efficient device can reduce the exertion required by an individual to move a load.

A blocking member 160 can also be included as shown in FIGS. 6 and 7, the blocking member 160 providing at least partial coverage of the rod 132 when the contact plate 110 is in the compressed position. In this manner, greater safety can be afforded for an individual that works in the proximity of the device 10. In addition, the base 150, to which the backing plate 120 and/or blocking member 160 can be attached, can itself be attached to a floor, wall, etc. using any type of fastener device or mechanism known to those skilled in the art, illustratively including a threaded fastener 152, lag bolt, and the like.

The invention is not restricted to the illustrative examples described above. The examples and embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. A manual force reduction device for reducing a force required to initiate movement of a load by a separate mechanism, said device comprising: an energy storage mechanism having a compressed position and a released position, said energy storage mechanism operable to store a predetermined amount of energy when in said compressed position; a load operable to come into contact with said energy storage mechanism and place said energy storage mechanism into said compressed position, said load having a catch mechanism with a rod; said energy storage mechanism having a latch operable to engage said rod of said load catch mechanism and attach directly to said load, said latch also operable to hold said energy storage mechanism in said compressed position when attached to said load, said energy storage mechanism also having a contact plate with a track mechanism in the form of a wheel that is operable to ensure said contact plate moves in a first direction in a controlled manner; a latch release operable to release said energy storage mechanism from said compressed position; release of said energy storage mechanism from said compressed position transferring said predetermined amount of energy to said load, for the purpose of reducing the force required to initiate movement of said load by the separate mechanism.

2. The manual force reduction device of claim 1, wherein said energy storage mechanism has a contact a backing plate and a coil spring, said coil spring located between said contact plate and said backing plate.

3. The manual force reduction device of claim 2, wherein said coil spring compresses between said contact plate and said backing plate when said contact plate is displaced in a first direction, said compressed coil spring having at least part of said predetermined amount of stored energy.

4. The manual force reduction device of claim 3, wherein said latch engages the load when the load is in contact with said contact plate and is displaced in said first direction a predetermined distance.

5. The manual force reduction device of claim 4, wherein the load is attached to said energy storage mechanism when said latch engages the load.

6. The manual force reduction device of claim 5, wherein said latch release disengages said latch from the load and said coil spring releases said stored energy to the load when said contact plate is displaced in a second direction, whereby the release of said stored energy reduces the force required to initiate movement of the load by the separate mechanism.

7. A manual force reduction device for reducing a force required for an individual to initiate movement of a pallet having a plurality of components stacked thereon, said device comprising: an energy storage mechanism having a contact plate with a track mechanism in the form of a wheel that is operable to ensure said contact plate moves in a first direction in a controlled manner; a coil spring and a rod attached to said contact plate and located at least partially within said coil spring, said contact plate having a compressed position wherein said coil spring is compressed and a released position wherein said coil spring is compressed less than when said contact plate is in said compressed position; a palletizer operable to come into contact with said contact plate; said contact plate operable to be displaced in said first direction when said palletizer contacts said contact plate and moves in said first direction, wherein displacement of said contact plate in said first direction compresses said coil spring and said coil spring stores a predetermined amount of energy when compressed; a latch operable to attach directly to and hold said palletizer adjacent said contact plate when said contact plate is in said compressed position; and a latch release coupled to said latch and operable to release said latch from holding said palletizer adjacent said contact plate; said latch releasing said coil spring to transfer said predetermined amount of stored energy to said palletizer in a second direction, for the purpose of reducing the force required for the individual to initiate movement of said palletizer having the plurality of components stacked thereon.

8. The manual force reduction device of claim 7, wherein said contact plate is a generally vertical contact plate, said generally vertical contact plate operable to engage said palletizer when said palletizer is displaced in said first direction.

9. The manual force reduction device of claim 8, wherein said generally vertical contact plate pushes on said palletizer when said coil spring decompresses and said generally vertical contact plate moves from said compressed position towards said released position.

10. The manual force reduction device of claim 7, further comprising a backing plate having a rod aperture, said rod extending through said rod aperture and sliding through said backing plate when said contact plate is displaced in said first direction.

11. The manual force reduction device of claim 10, wherein said backing plate has a fixed position and said coil spring compresses up against said backing plate when said contact plate is displaced in said first direction.

12. The manual force reduction device of claim 7, wherein said latch has a catch tab operable to engage said palletizer when said palletizer is displaced a predetermined distance in said first direction against said contact plate.

13. The manual force reduction device of claim 12, wherein said latch with said catch tab pivots about a latch axis.

14. The manual force reduction device of claim 13, wherein said latch release is attached to said latch using a pivot rod.

15. The manual force reduction device of claim 14, wherein said latch release is a lever attached to said latch using said pivot rod.

16. The manual force reduction device of claim 15, wherein said latch release is a foot-activated latch release.

17. The manual force reduction device of claim 13, wherein said latch with said catch tab pivots about said latch axis in a generally upwardly direction when said palletizer is displaced in said first direction and contacts said catch tab.

18. The manual force reduction device of claim 17, wherein said latch with said catch tab pivots about said latch axis in a generally downwardly direction when said catch tab engages said palletizer.

19. The manual force reduction device of claim 13, wherein said latch with said catch tab pivots in a generally upward direction when said catch tab disengages said palletizer.

20. The manual force reduction device of claim 13, wherein said catch tab attaches said palletizer to said energy storage mechanism when said palletizer is displaced a predetermined distance in said first direction against said contact plate.

\* \* \* \* \*